(12) United States Patent
Muhonen et al.

(10) Patent No.: US 7,512,401 B2
(45) Date of Patent: Mar. 31, 2009

(54) METHOD AND SYSTEM FOR UPDATING CAPABILITIES OF A DEVICE

(75) Inventors: Ahti Muhonen, Hirvihaara (FI); Juha H. Salo, Littoinen (FI); Janne La Aaltonen, Turku (FI); Janne Antola, Laitila (FI); Ari Pajusalo, Helsinki (FI); Ari Hännikäinen, Lempäälä (FI)

(73) Assignee: Nokia Corporation, Espoo (FI)

( * ) Notice: Subject to any disclaimer, the term of this patent is extended or adjusted under 35 U.S.C. 154(b) by 655 days.

(21) Appl. No.: 11/097,376

(22) Filed: Apr. 4, 2005

(65) Prior Publication Data

US 2006/0223503 A1 Oct. 5, 2006

(51) Int. Cl.
*H04M 3/00* (2006.01)

(52) U.S. Cl. .................. 455/414.1; 455/418

(58) Field of Classification Search .......... None
See application file for complete search history.

(56) References Cited

U.S. PATENT DOCUMENTS

| | | | |
|---|---|---|---|
| 5,848,064 A | 12/1998 | Cowan | |
| 5,859,979 A | 1/1999 | Tung et al. | |
| 6,031,830 A | 2/2000 | Cowan | |
| 6,556,217 B1 | 4/2003 | Mäkipää et al. | |
| 6,643,506 B1 | 11/2003 | Criss et al. | |
| 6,832,373 B2 | 12/2004 | O'Neill | |
| 2002/0157090 A1 | 10/2002 | Anton, Jr. | |
| 2003/0118049 A1 | 6/2003 | Bender et al. | |
| 2003/0158938 A1 | 8/2003 | Adatrao et al. | |
| 2004/0009770 A1* | 1/2004 | Sivanandan et al. | 455/425 |
| 2004/0101125 A1 | 5/2004 | Graf et al. | |
| 2006/0030303 A1* | 2/2006 | Albertsson et al. | 455/414.2 |

FOREIGN PATENT DOCUMENTS

| | | |
|---|---|---|
| EP | 0876070 A1 | 11/1998 |
| EP | 1180903 A1 | 2/2002 |
| GB | 2348083 A | 9/2000 |
| WO | WO 98/52105 | 11/1998 |
| WO | WO 01/35595 A1 | 5/2001 |
| WO | WO 2005/008940 A2 | 1/2005 |

* cited by examiner

*Primary Examiner*—Thanh C Le

(57) ABSTRACT

A method and system for transmitting data to a device is described. The method includes steps of comparing, in a server, a list of capabilities of the server against a list of capabilities of a mobile terminal and creating a list of capabilities in the server and not in the mobile terminal. The method and system wirelessly transmit, to the mobile terminal, a request to confirm the capabilities of the mobile terminal. The mobile terminal receives the request and the list of capabilities and compares the list of capabilities to current capabilities of the mobile terminal and then wirelessly transmits data identifying its capabilities to the server, the data including information of new capabilities of the mobile terminal. The server then updates the list of capabilities of the mobile terminal based on the information of new capabilities.

38 Claims, 10 Drawing Sheets

METHOD AND SYSTEM FOR UPDATING CAPABILITIES OF A DEVICE

FIELD OF THE INVENTION

Aspects of the present invention are directed generally to methods and systems for data transmission. More particularly, aspects of the present invention are directed to methods, devices, and system for determining the capabilities of a device and updating transmission formats and/or content based upon new capabilities.

BACKGROUND OF THE INVENTION

With the expansion of wireless networks that allow for the transmission and reception of high volumes of data, new capabilities and services are being developed continuously. As these capabilities and services are deployed, more bandwidth is consumed during on-peak times of the day. In response, systems have been developed to provide services during off-peak hours in order to minimize the effects of long download times during on-peak periods.

A client-server operation, which allows system operators to offer associated users an over-the-air/wireless method for receiving multimedia content for off-line consumption is known. The Nokia Media Charger solution, by Nokia Corporation of Finland, is an example of one such operation. Preselected services, such as videos, music, television programs, games or any other data files may be delivered to devices during off-peak periods, such as overnight, to take advantage of low network utilization times. The content is distributed over existing cellular/wireless networks and stored in memory of a mobile device, giving users immediate access to new content. The operation need not be tied to any specific access technology and may use existing cellular networks, for example, General Packet Radio Service (GPRS), Enhanced Data for GSM Evolution (EDGE), and Wideband Code Division Multiple Access (WCDMA).

Using the Media Charger solution, users enjoy instant access to a television episode or video clip at a time and place convenient for them. Users receive new, fresh content each night, with optimized video and audio quality. The choices of content may be personal preferences according to the user's schedule, and it may be available whenever and wherever the user wants it. Network operators are thus able to use the off-peak capacity of mobile data network traffic to increase consumer data usage.

Mobile terminal features differ between different types and/or manufacturers of mobile terminals. Conventional mobile terminals allow for a user to change a memory card and/or a subscriber identity module (SIM) card. Companies are currently developing other interchangeable parts of mobile terminals. For example, it is possible to add a global positioning system (GPS) battery pack and/or a terminal cover to certain mobile terminals. Development is being done also to allow a user to couple an external portable display to a mobile terminal. In such a case, the user is able to receive higher quality video images via their wireless network than with the integrated display on his/her mobile terminal.

Currently, a problem remains that wireless network operations are unaware of component changes and/or added functionality that are available to the wireless network at the mobile terminal. Any application other than the one running the new feature is unaware of new features added to the mobile platform. As such, a user may purchase a new component, such as an external portable display, but is unable to receive the higher quality images/data automatically without some type of interaction with their network provider.

SUMMARY OF THE INVENTION

There exists a need for the ability to check and/or update the capabilities of a mobile terminal and/or network node automatically so that a server may provide content/data in a specific format. An aspect of the invention includes a method for transmitting data to a terminal, the method includes comparing a first list of capabilities of the server against a second list of capabilities of a mobile terminal, creating a third list of capabilities in the server and not in the mobile terminal, wirelessly transmitting a request to confirm the capabilities of the mobile terminal, said request including the third list, receiving the request at the mobile terminal and comparing the third list to current capabilities of the mobile terminal, transmitting data identifying capabilities to the server, the data including information of current capabilities of the mobile terminal, and updating, at the server, the second list of capabilities based on the information of current capabilities.

Another aspect of the present invention provides a method for selecting a network node for transmission of a service from a server to a terminal, the method includes maintaining a first list of capabilities for each of a plurality of network nodes, a second list of capabilities for each of a plurality of terminals, and a third list of capabilities of a server, determining whether a network node of the plurality of network nodes is capable of delivering a service to a terminal of the plurality of terminals in accordance with a specified format, upon determining that the network node is not capable of delivering the service to the terminal in accordance with the specified format, updating the network node to be able to deliver the service, and delivering the service to the terminal via the network node.

Still another aspect of the invention provides a method for selecting a network node for transmission of a service from a server to a terminal, the method including maintaining a first list of capabilities of a plurality of network nodes, a second list of capabilities of a plurality of terminals, and a third list of capabilities of a server, determining whether a first network node of the plurality of network nodes is capable of delivering a service to a terminal of the plurality of terminals in accordance with a specified format, upon determining that the network node is not capable of delivering the service to the terminal in accordance with the specified format, selecting a second network node of the plurality of network nodes configured to deliver the service, and delivering the service to the terminal through the second network node.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1A:
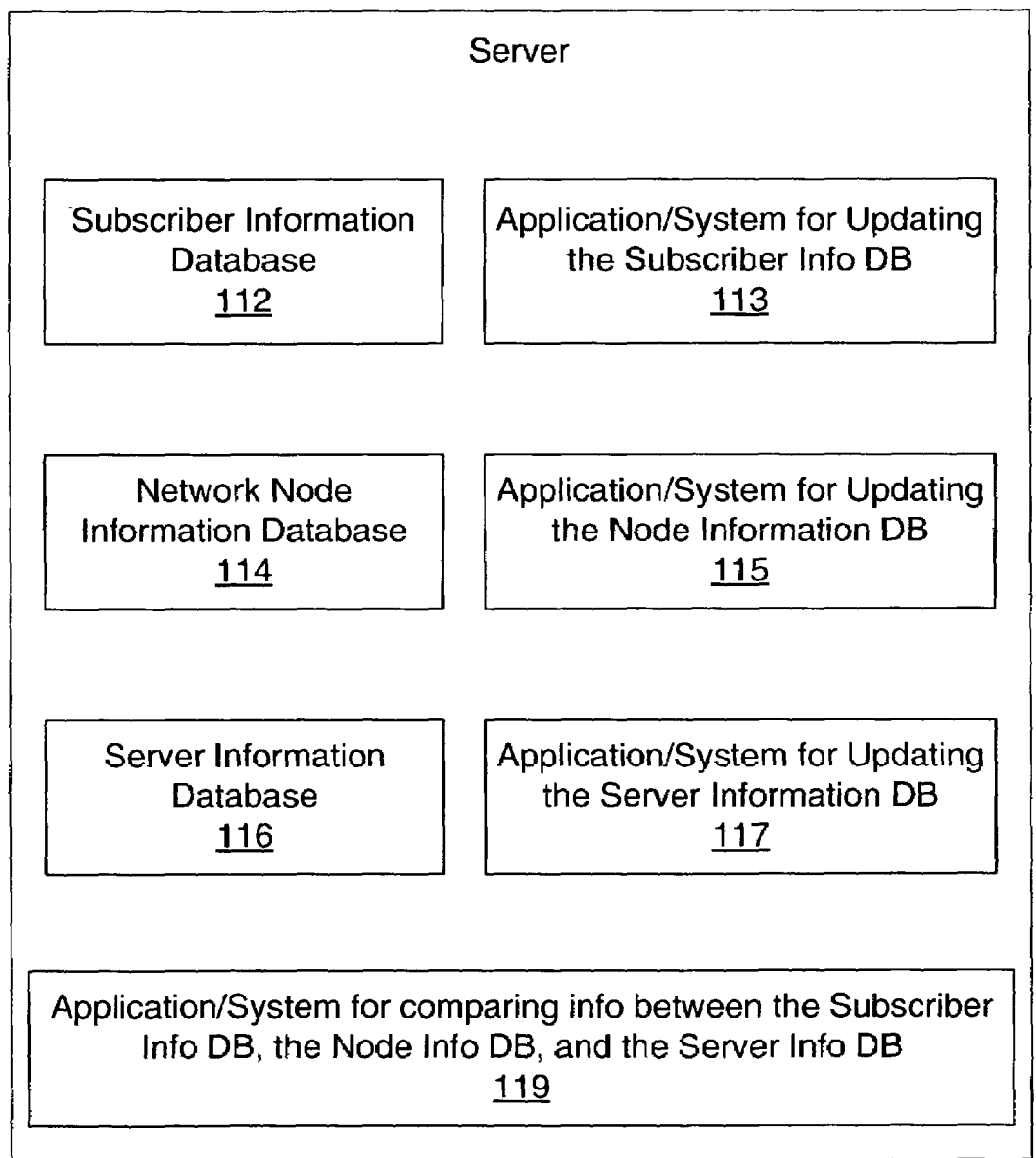
FIG. 1A illustrates a block diagram of a server in a system for determining the capabilities of a device and updating transmission formats and/or content based upon new capabilities in accordance with at least one aspect of the present invention.

FIG. 1A illustrates a block diagram of a server in a system for determining the capabilities of a device and updating transmission formats and/or content based upon new capabilities in accordance with at least one aspect of the present invention. It should be understood that the server illustrated and hereinafter described merely is illustrative of one type of server system that would benefit from the present invention and, therefore, should not be taken to limit the scope of the present invention.

Server 110 may include a central processing unit (CPU) (not shown) for running operating system and applications on the server and a plurality of databases and a plurality of applications and/or systems for updating the databases. Server 110 may include a subscriber information database 112. Subscriber information database 112 may include a listing of capabilities, e.g., applications, drivers, and/or features and listing of external and/or peripheral devices associated with the server 110. For example, if a user obtains a new GPS device to attach to her mobile terminal, an application that recognizes the GPS function may be an "application," a driver for operating the GPS function may be a "driver," and the GPS function itself may be a "feature."

Capabilities may include. a compression/decompression method of a data/video/audio signal, such as different versions of MPEG (e.g., MPEG1, MPEG, 2, MPEG3, MPEG4), digital video broadcasting (DVB) (e.g., DVB-T, DVB-S, DVB-H), digital multipoint bridge (DMB), and digital audio broadcast (DAB). Capabilities also may include a type of network connection (e.g., wireless local area network (WLAN), Bluetooth, infrared standards of InfraRed Data Association (IrDA), ultra wideband (UWB), universal mobile telecommunications system (UMTS), third generations mobile system (3G), Wideband Code Division Multiple Access (WCDMA)) and its update and/or its capacity. Other capabilities may include a type of one or more media players available, or any other software applications. Capabilities also may include a size and/or type of available mass memory. The external or peripheral devices may be such as displays, game consoles, TVs, audio devices, personal video recorder/digital video recorder (PVR/DVR), mass storage devices, GPS devices, and PC computers. Capabilities may be added and/or changed by changing device covers, a battery pack, a carrying case, and/or a keyboard, among other components.

Additionally, the database 112 may include information on several user devices and their available capabilities and external devices correspondingly. Additionally, the database 112 may include information on one or more other servers connected to the server 110 and their available capabilities. Server 110 also may include an application and/or system 113 for updating the subscriber information database 112. The application and/or system 113 may operate to update data within the subscriber information database 112 automatically or in conjunction with input received from an individual.

Server 110 also may include a network node information database 114. Network node information database 114 may include a listing of capabilities, e.g., applications, drivers, and/or features and listing of external and/or peripheral devices of one or more access points, which may be included within one or more networks, associated with the server 110 and/or a terminal device that the network node is capable of handling. Server 110 also may include an application and/or system 115 for updating the network node information database 114. The application and/or system 115 may operate to update data within the network node information database 114 automatically or in conjunction with input received from an individual.

In addition, server 110 may include a server information database 116. Server information database 116 may include a listing of capabilities, e.g., applications, drivers, and/or features and listing of external and/or peripheral devices of the server 110 that the server is capable of handling. Server 110 also may include an application and/or system 117 for updating the server information database 116. The application and/or system 117 may operate to update data within the server information database 116 automatically or in conjunction with input received from an individual.

With these three databases, subscriber information database 112, network node information database 114, and server information database 116, server 110 may be configured to transmit a service to a terminal device of a user based upon the capabilities of the terminal device, one or more network nodes, and/or the server 110. Finally, server 110 also may include an application and/or system 119 for comparing information between the subscriber information database 112, the network node information database 114, and the server information database 116. An illustrative method for comparing the information within the subscriber information database 112, the network node information database 114, and the server information database 116 is described herein below. As used herein, a service includes data for a particular application, such video content with enhanced color depth and/or resolution data, audio content with enhanced octave range data, and GPS mapping data. A service may be transmitted to a mobile device differently based upon the capabilities of the mobile device. A mobile device with the capability to receive a certain color depth range may receive video data with the higher range data. Server 110 also may include or be connected to a content database (not shown) having media content to be delivered to subscriber terminals, such as Nokia Media Charger databases and system by Nokia Corporation of Finland. Server 110 further may include or be connected to an application/software database (not shown) having applications/software to be delivered to the subscriber terminals and/or the network nodes for updates. Server 110 may be located at any position within a network in communication with terminals devices.

Figure 1B:
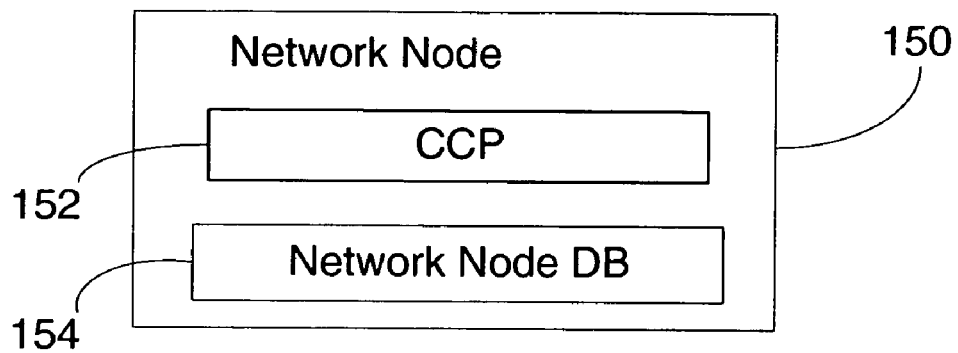
FIGS. 1B and 1C illustrate block diagrams of a network node and a terminal, respectively, in a system for determining the capabilities of the terminal device and updating transmission formats based upon new capabilities in accordance with at least one aspect of the present invention.
Figure 1C:
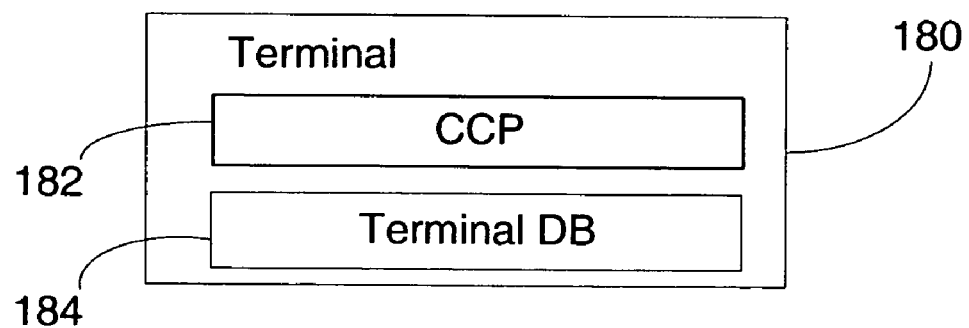

FIGS. 1B and 1C illustrate block diagrams of a network node and a terminal, respectively, in a system for determining the capabilities of the terminal device and updating transmission formats and/or content based upon new capabilities in accordance with at least one aspect of the present invention. It should be understood that the network node and the terminal device illustrated and hereinafter described are merely illustrative of one type of network node and terminal device that would benefit from the present invention and, therefore, should not be taken to limit the scope of the present invention.

As shown in FIG. 1B, network node 150 may include a CPU (not shown) and a network node information database 154. Network node information database 154 may include a listing of capabilities, e.g., applications, drivers, and/or features, of the network node 150 associated with a server and various terminal devices. Network node 150 also may include a client component proxy 152, which is an application and/or system for checking for known capabilities in terminal devices associated with the network node 150. Additionally, the client component proxy 152 in the network node 150 also may be an application and/or system for checking for known capabilities of the network node associated with the server 110. The client component proxy 152 also may communicate the capabilities of associated terminal devices and/or the network node 150 to a server, such as server 110. The client component proxy 152 may operate to update data within the network node information database 154 or the subscriber information database 112. The client component proxy 152 may be configured to receive a request from a server to compare a list of capabilities needed to transmit a new service to a terminal device. The network node 150 may be updated by a server when the network node 150 needs to be updated in order to properly transmit a new service to a terminal device through the network node 150. In one embodiment of the present invention, the functions and/or operations of a server 110 may be included within a network node 150.

For example, a user may purchase a new external speaker device in order to allow her mobile terminal to be used as a stereo. The new external speaker device may be manufactured by a third party and the device may allow for output of audio at specified frequency ranges, including an entire octave higher than competitive speaker devices. In this case, the terminal has the capability to interpret data for the higher octave range and the associated server may also have the capability. If a network node 150 between the mobile terminal of the user and the server lacks the capability to provide/forward such a service to the terminal, the associated server may be configured to update this capability in the network node 150 in order to allow for transmission of the service through the network node to the terminal. It should be understood by those skilled in the art that a network node 150, although shown as a single block in the Figures, may include one or more components and may include one or more wireless or wireline networks. The present invention is not so limited to a single device and/or configuration.

As shown in FIG. 1C, terminal device 180 may include a terminal information database 184. Terminal information database 184 may include a listing of capabilities, e.g., applications, drivers, and/or features of the terminal device 180 associated with a server and/or a network node. Terminal device 180 also may include a client component proxy 182, which is an application and/or system for checking for known capabilities in the terminal device 180. The client component proxy 182 is configured to receive a request from a server and/or a network node to compare a list of capabilities needed to transmit one or more new services to the terminal device 180. The client component proxy 182 also may communicate the capabilities of the terminal device to a server, such as server 110, and/or a network node, such as network node 150. The client component proxy 182 may operate to update data within the terminal information database 184. The terminal 180 may be updated by a server when the terminal 180 needs to be updated in order to properly transmit a new service to the mobile terminal 180. Such an update may occur in a similar manner as described above with reference to a server updating a network node. Alternatively, mobile terminal 180 also may be notified by a server when the terminal 180 needs to be updated with a new capability in order to properly receive the new service.

The servers, network nodes, and terminal devices described herein may be capable of operating with one or more air interface standards, communication protocols, modulation types, and access types. More particularly, these components may be capable of operating in accordance with any of a number of first-generation (1G), second-generation (2G), 2.5G, and/or third-generation (3G) communication protocols, future developed protocols, or the like. For example, the components may be capable of operating in accordance with 2G wireless communication protocols IS-136 (TDMA), Global System for Mobile Communications (GSM), and IS-95 (CDMA). The components additionally or alternatively may be capable of operating in accordance with any of a number of different digital, such as TV, audio, video, data or satellite, broadcasting techniques, such as using DVB (e.g., DVB-T, ETSI Standard EN 300 744). The components also may be capable of operating in accordance with any of a number of different broadcast and/or multicast techniques, such as using MBMS (e.g., 3GPP TS 22.146). Further the components may be capable of operating in accordance with ISDB-T, DAB, and ATSC techniques or the like. As described herein, aspects of the present invention are not limited to any particular communication or transmission protocol and/or technique and any number of different communication standards, protocols, and/or techniques may be used, such as WLAN, WiFi, Bluetooth, UWB, GSM, GPRS, UMTS, DVB-H, DVB-S, DAB, DMB (digital multimedia broadcasting), SGML and XML.

Figure 2A:
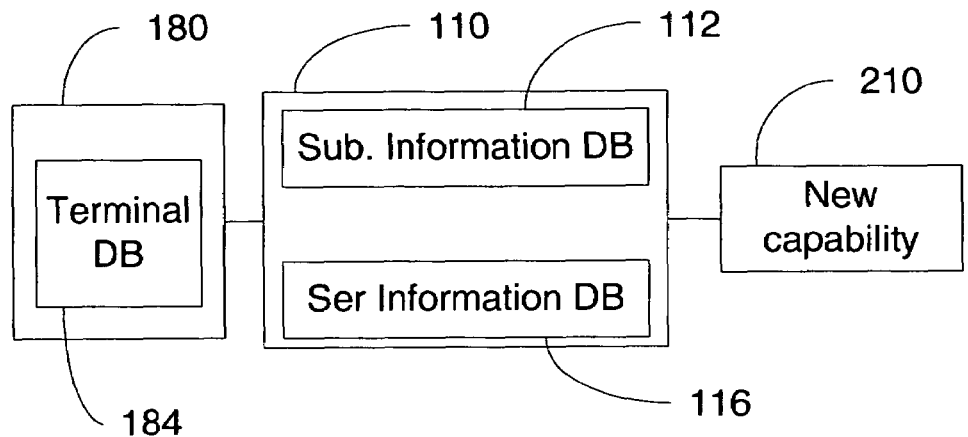
FIGS. 2A and 2B illustrate exemplary block diagrams of a system for determining the capabilities of the terminal device and updating transmission formats based upon new capabilities in accordance with at least one aspect of the present invention.

FIG. 2A illustrates a block diagram of a system for determining the capabilities of the terminal device and updating transmission formats based upon new capabilities in accordance with at least one aspect of the present invention. As new capabilities are developed, server 110 is updated with the available capability 210. The available capabilities may be received from a database. The database from which the new capability 210 is obtained may be internal to or external from the server 110. In accordance with at least one aspect of the present invention, server 110 requests a determination of terminal capabilities at a terminal 180 in order to allow for transmission of a new service to the terminal 180 in a particular desired manner.

For example, if a new external display component is developed having certain display characteristics (e.g., resolution, color depth, etc.) and reception capabilities, a server 110 may be configured to be updated with this new capability and/or a database on the system may be updated with information regarding the new external display component. Alternatively or additionally, the server information database 116 may be updated with information regarding the new external display component. This new capability is added to the list of capabilities that the server 110 requests to be checked on a terminal device 180. Should the terminal 180 include the new external display component and upon receipt of the request from the server 110, the terminal 180 communicates its new capability back to the server 110, thus allowing the server 110 to transmit data/content to the terminal 180 based upon a higher transmission quality now available to be displayed by the mobile terminal 180.

In this example, a third party manufacturer develops a new add-on display that provides a much higher resolution and broader color range than the standard display component of a mobile terminal of a user. Information regarding the new add-on display is provided to a server and/or new add-on display capabilities are updated to the server and the information is stored in the server information database 116. Such information may include manufacturer data, data transmission formats for the higher resolution data, and color depth range formats for the color depth data. The server then transmits a request to confirm whether a particular and/or any terminal device has the capabilities of the new add-on display. If a mobile terminal of a user who has purchased the third party display is associated with the server, the mobile terminal receives the requests and communicates back to the server information to identify that the mobile terminal indeed does have the capability to receive the higher resolution and/or broader color depth range. The server receives the information from the terminal device and then transmits data/content to the terminal. The data/content includes the higher resolution data and broader color depth range data.

Figure 2B:
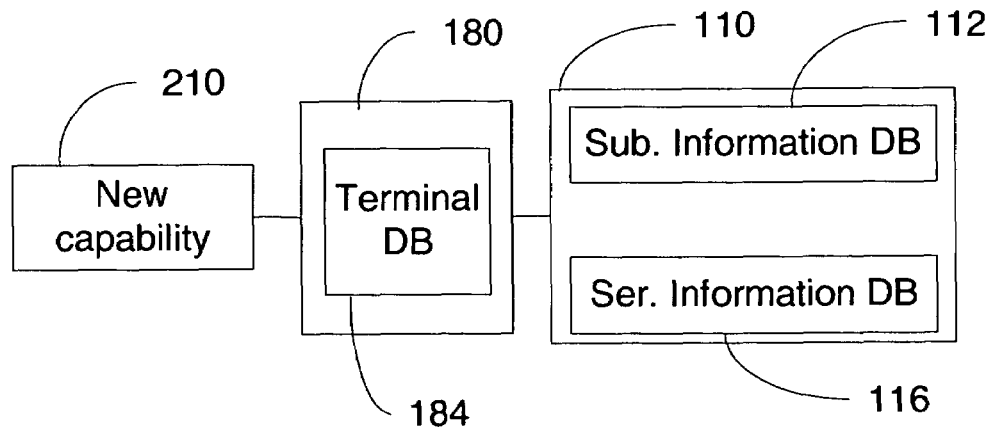

FIG. 2B illustrates a block diagram of another system for determining the capabilities of the terminal device and updating transmission formats based upon new capabilities in accordance with at least one aspect of the present invention. The terminal device may be a wireless communication device, a network node, or another server. As new capabilities are developed, terminal device 180 is updated with the available capability 210. The available capabilities may be received from a database. In accordance with at least one aspect of the present invention, a server 110 transmits a list of capabilities in the server and not in the mobile terminal to the terminal 180 in order to determine a desired manner of transmission of a new service to the terminal 180. As shown in FIG. 2B, a client component proxy in the terminal 180 may run an internal request to update the capabilities list from the server 110. Exemplary methods for running this request are described herein below. In this case, a new capability 210 may be obtained by the terminal 180 without being obtained by the server. Such a case may occur in which a server 110 associated with a terminal 180 has yet to receive data corresponding to the new capability 210. In such an example, the terminal updates the list of capabilities to include information regarding the new capability 210. Upon receipt of the updated list of capabilities at the server 110, server 110 may seek to obtain information regarding the new capability 210 internally and/or from another source.

Figure 3:
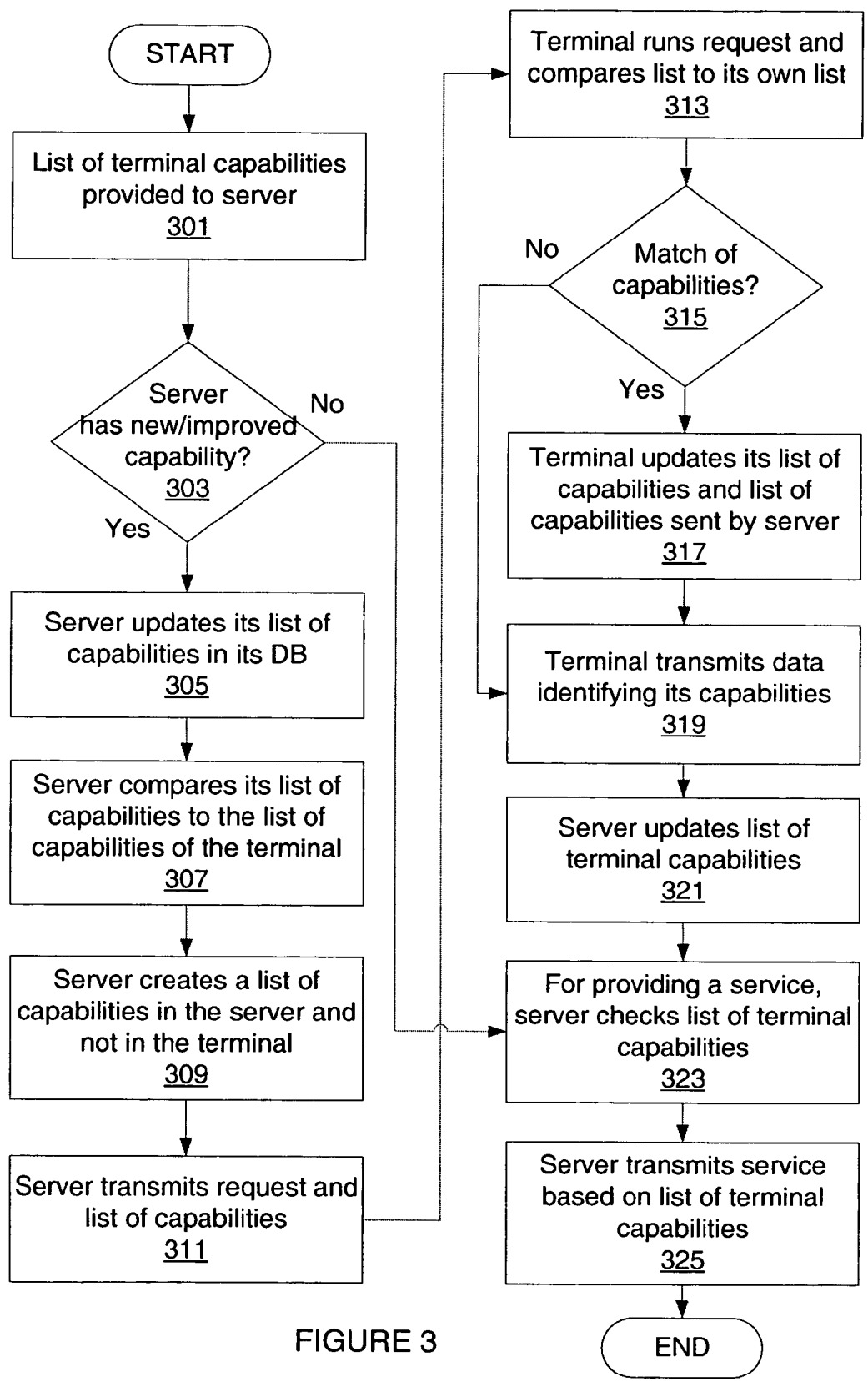
FIG. 3 is a flowchart of an illustrative example of a method for determining the capabilities of a terminal device and updating transmission formats based upon new capabilities in accordance with at least one aspect of the present invention.

FIG. 3 is a flowchart of an illustrative method for determining the capabilities of a terminal device and updating transmission formats based upon new capabilities in accordance with at least one aspect of the present invention. The process starts at step 301 where a server is provided with a list of capabilities of a terminal. The information in this list of capabilities may be the default information for a standard terminal without any additional capabilities, or the list may include recently updated capabilities of the mobile terminal, or the list may include capabilities of the mobile terminal at the moment of a service subscription or set up. At step 303, a determination is made as to whether the server has received information regarding a new/improved capability, or the server has been updated with a new/improved capability.

At step 307, the server compares its list of capabilities with the list of capabilities of the terminal device. Responsive to the comparison in step 307, at step 309, the server creates a list of capabilities in the server and not in the terminal device according to the information in the subscriber information database. The server then wirelessly transmits a request to compare capabilities and/or the list of capabilities to the terminal device at step 311.

The process proceeds to step 313 where the terminal receives the request and/or the list of capabilities and the client component proxy in the terminal runs the request by comparing the list of capabilities with the list of terminal capabilities in the terminal information database in the terminal. The list of terminal capabilities may be updated every time a new capability is installed or updated in the terminal. The list of terminal capabilities may be also updated when the request for comparing the list of capabilities is received. At step 315, a determination is made as to whether the list of capabilities in the terminal matches any of the capabilities received from the server. If there is a match, the process proceeds to step 317 where the terminal updates its internal list of capabilities in its terminal information database as necessary, such as to indicate that the server is now aware of the new capability of the terminal, and the terminal updates the list of capabilities received from the server to indicate that at least one capability from the list of capabilities does exist in the terminal. The process then proceeds to step 319.

If there is no match at step 315, the process proceeds directly to step 319 where the client component proxy of the terminal wirelessly transmits data identifying at least one capability of the mobile terminal to the server. The data may be a capability from the list of capabilities received from the server that the terminal does have. Alternatively, the data may be the list of capabilities received from the server which has been updated in step 317 by the mobile terminal. If there was a match in step 315, the data may be an updated list from the one received by the terminal in step 313. If there was no match, the data may be the list of capabilities which has not changed from the list received in step 313.

At step 321, the server receives the identified data and updates the list of terminal capabilities in the subscriber information database as appropriate. When a new service is needed, at step 323, the server checks the list of terminal capabilities in the subscriber information database to determine the appropriate manner in which to provide the service. At step 325, the server wirelessly transmits the service to the terminal device based upon the capabilities of the terminal as defined in the subscriber information database. For example, the server may select a compression/decompression method for data/video/audio signal based upon the capabilities. Further, a type of network connection may be selected based upon the capabilities and its update and/or its capacity. Additionally, content may separated and be transmitted via two or more network connections, and/or at separate times, e.g. one or more part of content by day time and one or more part at night time (low cost and high capacity), or one or more content by streaming and one or more content advanced by data transfer at night time. Alternatively, content may be downscaled if it doesn't fit any available or any selected network connection. A transmitted file type may be selected based upon media players and their update available. Size of the content may based upon a size and/or type of available mass memory. Transmitted content may be selected or based upon the capabilities of the external or peripheral devices, such as displays, game consoles, TVs, audio devices, PVR/DVR, mass storage devices, GPS devices, PC computers, etc.

One or more steps of the method described in FIG. 3 may operate as described in the following illustrative example. A user purchases a new mobile terminal and a display that permits high definition (HD) transmissions to be received. A server associated with the mobile terminal maintains information on the particular mobile terminal that the user purchased. For example, the server may maintain data of the display capabilities of the display built into or connected to the mobile phone. Initially, the server may use a default configuration for the capabilities of the mobile terminal. At some time, the server sends a request to the mobile terminal to compare a list of capabilities to the current capabilities of the mobile terminal. In some cases, it may be asked from a user of the terminal if the comparison of capabilities is allowed. In some cases, the comparison of capabilities may happen automatically. The mobile terminal is connected, either directly or indirectly, to the display that permits HD reception. The mobile terminal wirelessly transmits data identifying the capability of the mobile terminal to receive HD transmissions. Alternatively, the mobile terminal may update the capabilities list received form the server to indicate that it can receive HD transmissions and then transmits the updated list back to the server. The server receives the identified data and updates its records to note that the terminal device is capable of receiving HD transmissions. When a user then requests a television program, the server checks its subscriber information database to see that the terminal is cable of receiving HD transmissions. As such, the server transmits the television program in HD format as opposed to some other format.

Utilizing this method, the server is updated when a terminal device acquires a new capability. Alternatively, the subscriber information database in the server is updated when the server acquires or offers a new capability. The request by the server may be implemented in a number of different manners. For example, the request may be implemented periodically, such as when a user initiates his/her terminal device with the server or a network, during particular time periods, such as during off-peak hours, by predefined time intervals, and/or according to some other manner. The new capabilities are implemented when preparing and transmitting services to the user terminal device. Examples of such services include new audio and/or video encoding formats and new terminal enhancements, such as a separate display unit, RFID user interfaces, GPS, and other sensors.

Figure 4A:
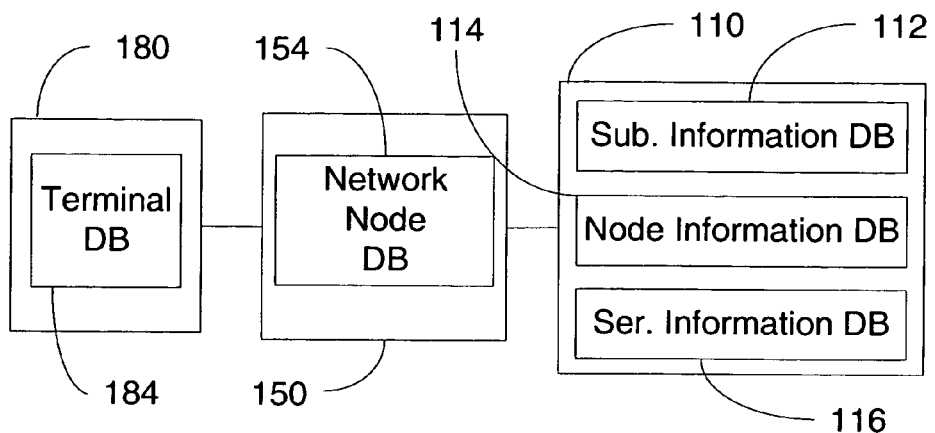
FIG. 4A illustrates an exemplary block diagram of another system for determining the capabilities of a network node and updating transmission formats based upon new capabilities in accordance with at least one aspect of the present invention.

FIG. 4A illustrates a block diagram of another system for determining the capabilities of a network node and updating transmission formats based upon new capabilities in accordance with at least one aspect of the present invention. As new capabilities are developed, server 110 is updated with the available capabilities. The available capabilities may be received form a database. The available capabilities database may be internal to or external from the server 110. In accordance with at least one aspect of the present invention, server 110 updates the capabilities of a network node in order to allow for transmission of a new service to the terminal 180 in a particular desired manner. As shown in FIG. 4A, a network node 150 is updated based upon the updated information of the capabilities of terminal 180. When the network node 150 is updated, it may send a confirmation to the server 110 that the update is complete.

For example, if a new external display component is developed having certain characteristics and reception capabilities, a server 110 may be configured to be updated with this new capability. This new capability is added to the list of capabilities that the server 110 requests to be checked on a terminal device 180. Should the terminal 180 include the new external display component and upon receipt of the request from the server 110, the terminal 180 communicates its new capability back to the server 110. If a network node 150 between the terminal 180 and the server 110 does not have the capability to transmit data/content to the terminal 180 based upon a higher transmission quality now available to be utilized by the mobile terminal 180, server 110 may update the network node as appropriate in order to allow for the transmission to the terminal 180. In addition, the network node may send a confirmation to the server 110 to indicate that the update was completed.

Figure 4B:
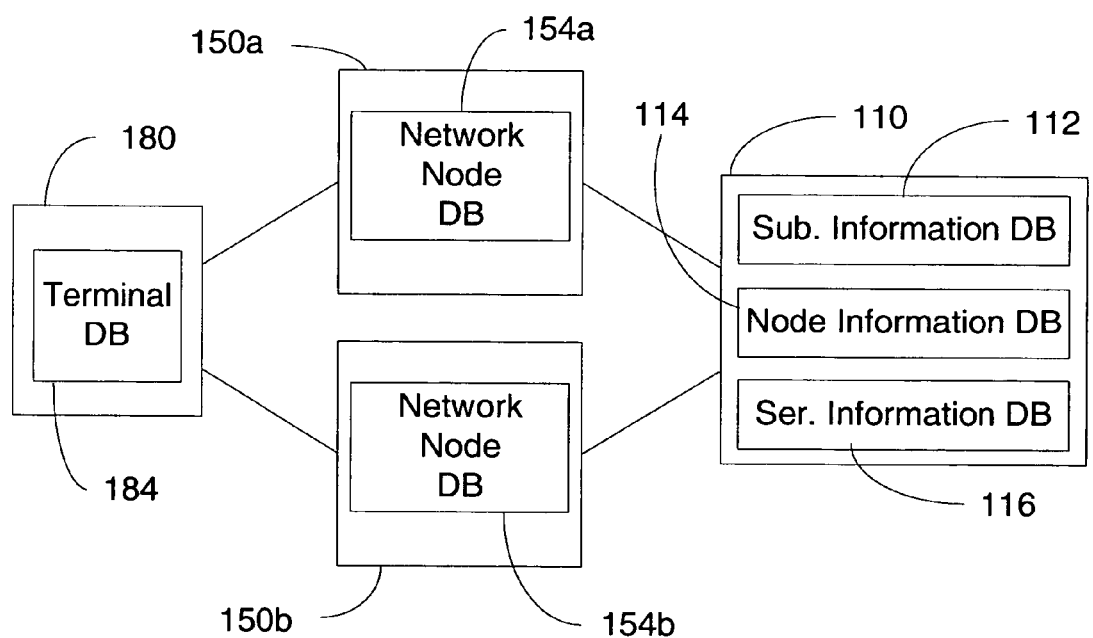
FIG. 4B illustrates an exemplary block diagram of another system for determining the capabilities of a network node and selecting a transmission format and/or path based upon new capabilities in accordance with at least one aspect of the present invention.

FIG. 4B illustrates a block diagram of another system for determining the capabilities of an access point/network and selecting a transmission format and/or path based upon new capabilities in accordance with at least one aspect of the present invention. As new capabilities are developed, server 110 is updated with these available capabilities, such as from a new capabilities database. The new capabilities database may be internal to or external from the server 110. In accordance with at least one aspect of the present invention, server 110 selects a network node in accordance with the capabilities of the network node in order to allow for transmission of a new service to the terminal 180 in a particular desired manner.

As shown in FIG. 4B, a network node 150*a* is initially selected to transmit a new service to terminal 180. Server 110 may check the capabilities of the network node stored in the network node information database 154*a*. If the server 110 determines that network node 150*a* is unable to transmit data/content to a terminal 180 according to a particular format and/or in a particular manner, server 110 may select a different network node 150*b* that is capable of transmitting in accordance with the capabilities of the terminal 180, the network node information database 154*b*, and the server 110. Alternatively and/or concurrently, as described with reference to FIG. 4A, network node 150*a* may be updated by the server 110 for future service transmissions.

Figure 5A:
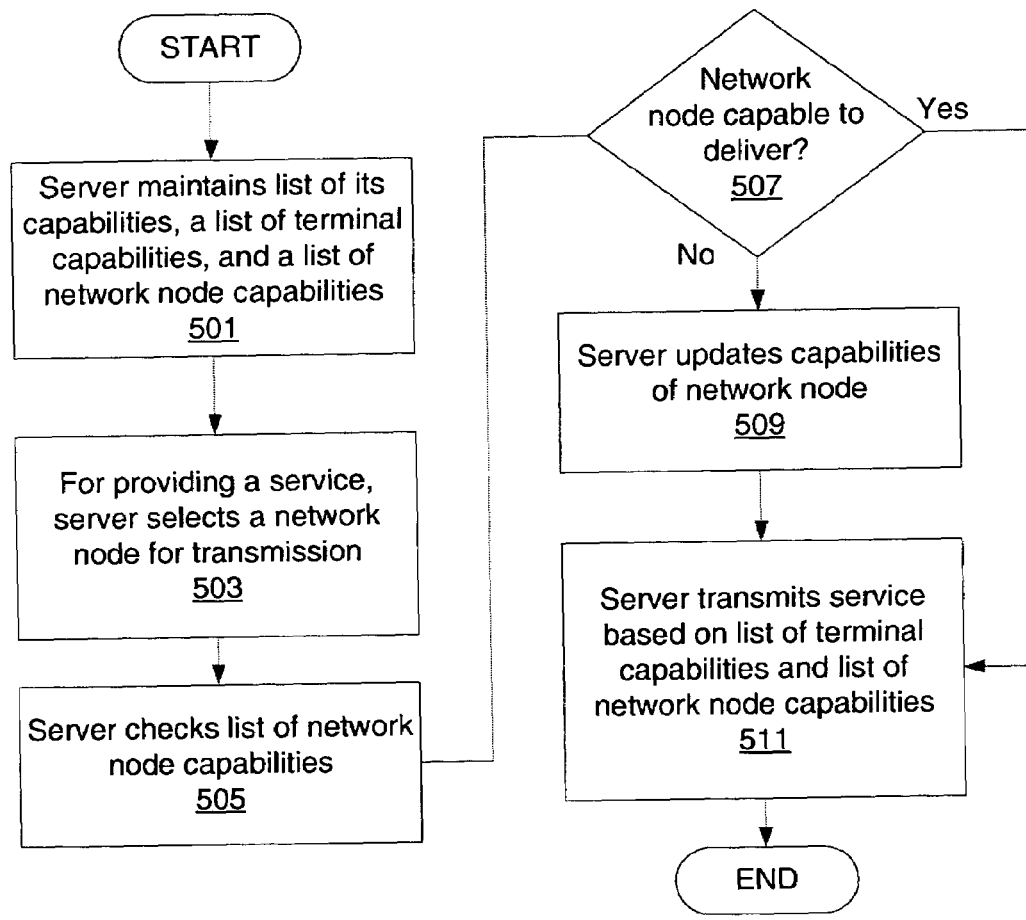
FIG. 5A is a flowchart, in accordance with the block diagram shown in FIG. 4A, of an illustrative example of another method for determining the capabilities of a network node and updating transmission formats based upon new capabilities in accordance with at least one aspect of the present invention.

FIG. 5A is a flowchart, in accordance with the block diagram shown in FIG. 4A, of an illustrative example of another method for determining the capabilities of a network node and updating transmission formats based upon new capabilities in accordance with at least one aspect of the present invention. The process starts at step 501 where a server maintains a list of its capabilities, a list of subscriber terminal capabilities, and a list of network node capabilities in a communication system. The list of capabilities of the server may be stored within a database, such as server information database 116. The list of capabilities of the network node may be stored within a database, such as network node information database 114. The list of capabilities of the network node may be stored when the node is connected to the server in the first instance. Finally, the list of capabilities of the terminal may be stored within a database, such as subscriber information database 112.

From step 501, the process proceeds to step 503. When attempting to provide a service to a terminal device, the server selects a network node for transmission. At step 505, the server checks the selected network node against the list of network node capabilities. Proceeding to step 507, a determination is made as to whether the selected network node is capable of delivering the service to the terminal in accordance with a particular format. The format may be selected according to the capabilities of the server and the terminal, e.g., both the server and the terminal have to support the particular format. If the selected network node is not capable of delivering data/content to the terminal in the desired manner/format, at step 509, the server updates the capabilities of the selected network node, for example the server may transmit needed software to the node, in order to allow the selected network node to transmit in the desired manner. The process then proceeds to step 511.

If the selected network node is capable of delivery of data/content to the terminal from the determination at step 507, the process proceeds directly to step 511. At step 511, the server transmits the service to the terminal device based upon the list of terminal capabilities and the list of network node capabilities for any particular and/or plurality of network node(s) between the server and the terminal device.

In accordance with another embodiment of the present invention, the server 110 may update capabilities of the user terminal 180 in a similar manner as described with reference to FIG. 5A. In another embodiment of the present invention, in step 509 the server transmits to the user terminal 180 information on which one or more network nodes, e.g., service points, a needed application, and/or software update, is available. Further this information may include locations of the suitable network nodes and/or types of suitable network nodes. If the location information is given, a user may head to one of the given locations. If the type information is given, the user may get the update automatically when the user accesses a suitable node.

Figure 5B:
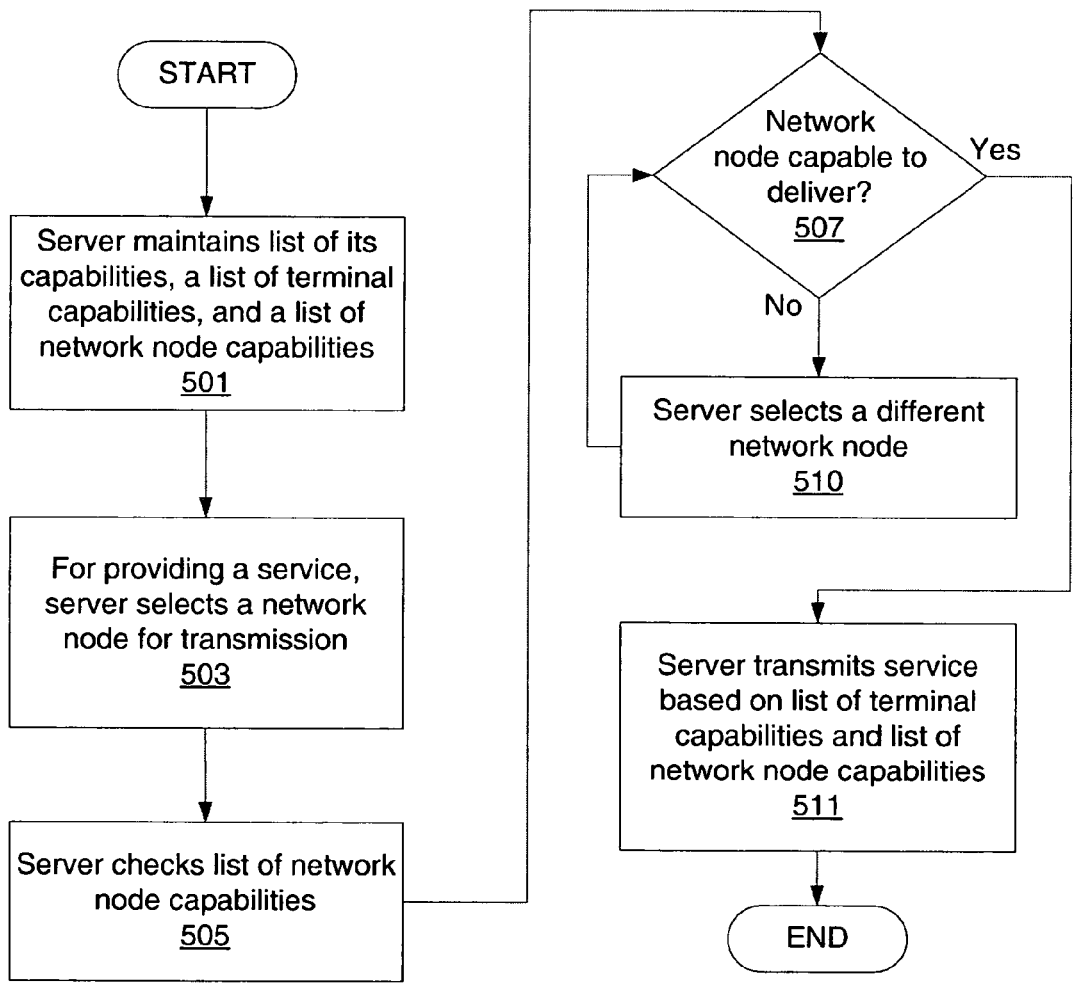
FIG. 5B is a flowchart, in accordance with the block diagram shown in FIG. 4B, of an illustrative example of another method for determining the capabilities of a network node and selecting transmission formats and paths based upon new capabilities in accordance with at least one aspect of the present invention.

FIG. 5B is a flowchart, in accordance with the block diagram shown in FIG. 4B, of an illustrative example of another method for determining the capabilities of a network node and selecting transmission formats and paths based upon new capabilities in accordance with at least one aspect of the present invention. The process starts at step 501 where a server maintains a list of its capabilities, a list of subscriber terminal capabilities, and a list of network node capabilities in a communication system. The list of capabilities of the server may be stored within a database, such as server information database 116. The list of capabilities of the network node may be stored within a database, such as network node information database 114. Finally, the list of capabilities of the terminal may be stored within a database, such as subscriber information database 112.

From step 501, the process proceeds to step 503. When attempting to provide a service to a terminal device, the server selects a network node for transmission. At step 505, the server checks the selected network node against the list of network node capabilities. Proceeding to step 507, a determination is made as to whether the selected network node is capable of delivering the service to the terminal in accordance with a particular format. The format may be selected according to the capabilities of the server and the terminal, e.g., both the server and the terminal have to support the particular format. If the selected network node is not capable of delivering data/content to the terminal in the desired manner/format, at step 510, the server selects a different network node in order to transmit data/content to the terminal device in the desired format/manner. The process then proceeds back to step 507.

If the network node is capable of delivery of data/content to the terminal from the determination at step 507, the process proceeds to step 511. At step 511, the server transmits the service to the terminal device based upon the list of terminal capabilities and the list of network node capabilities for any particular and/or plurality of network node(s) between the server and the terminal device. In accordance with another embodiment of the present invention, server 110 may select one of the user terminals 180 in a similar manner as described with reference to FIG. 5B.

Figure 6:
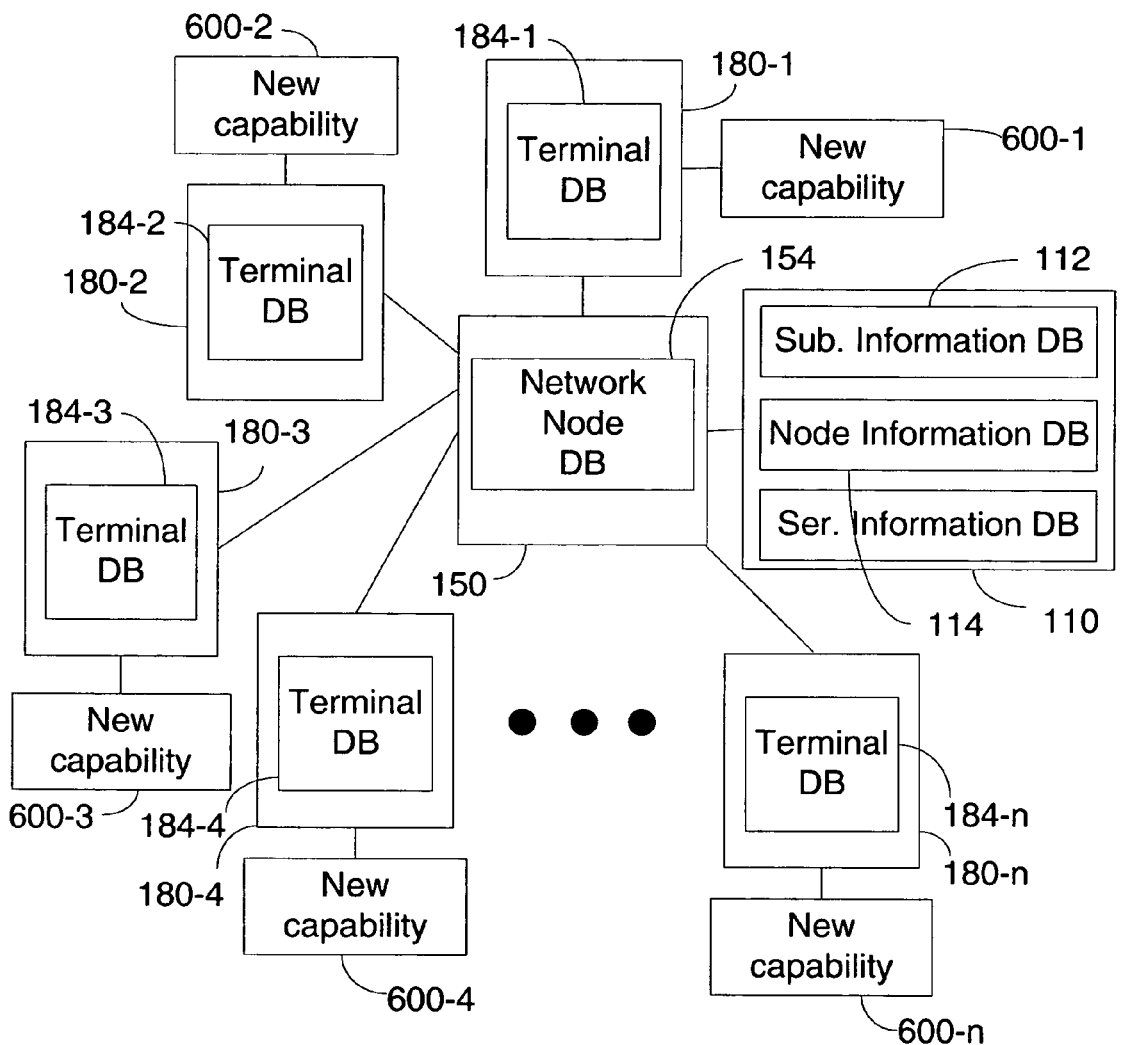
FIG. 6 illustrates a block diagram of another system for determining the capabilities of terminal devices and updating transmission formats and/or paths based upon new capabilities in accordance with at least one aspect of the present invention.

FIG. 6 illustrates a block diagram of another system for determining the capabilities of terminal devices and updating transmission formats and/or paths based upon new capabilities in accordance with at least one aspect of the present invention. In accordance with at least one aspect of the present invention, a network node 150 may be updated to handle transmission of data/content based upon a desired format/manner when a threshold number of terminals 180-1 to 180-n are capable of receiving the new capability. As shown, a new capability 600-1 to 600-n has been received by terminals 180-1 to 180-n respectively. The new capability 600 may be a GPS device to allow the terminal 180 to be tracked. In accordance with at least one aspect of the present invention, network node 150 may be updated to allow for transmission of data/content to the terminals 180-1 to 180-n.

The update to the network node may be configured to occur when a threshold number of terminals 180-1 to 180-n receive the new capability, e.g., when a threshold number of terminals 180 acquire a GPS device to attach to the terminal 180. The update may be based on information of the capabilities of the user terminals that are or that have been frequently used in connection to the network node. The subscriber information database 112 of server 110 also may track the particular network node(s) that have been connected to the particular user terminal 180. It should be understood that the threshold may be any specified number.

Figure 7:
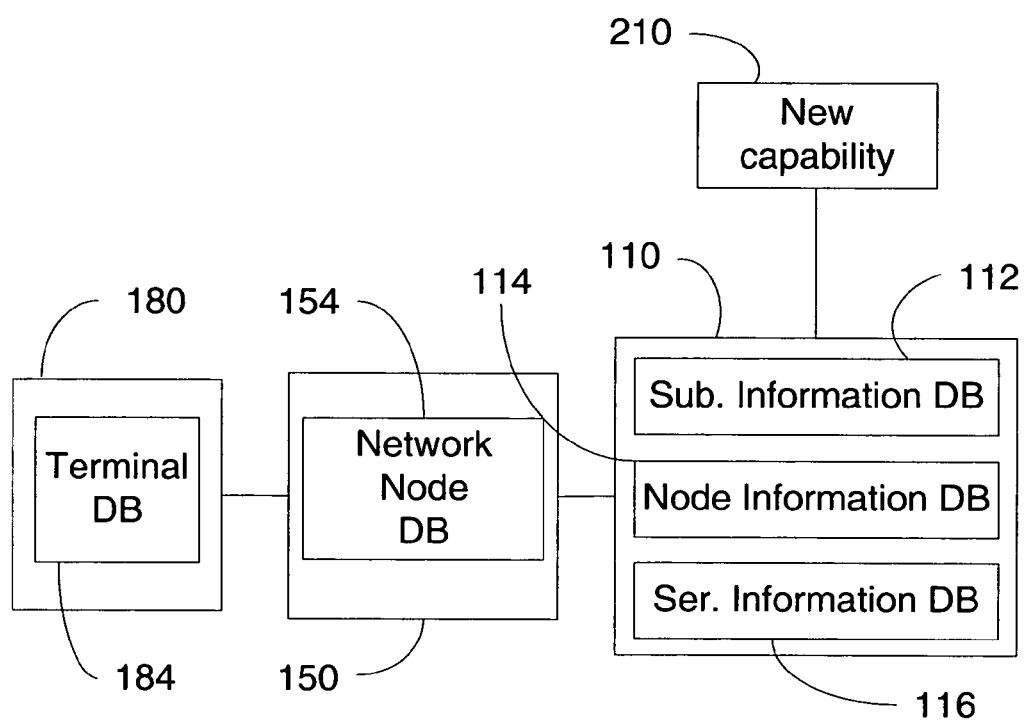
FIG. 7 illustrates a block diagram of a system for determining the capabilities of devices in the system and updating transmission formats based upon new capabilities in accordance with at least one aspect of the present invention.

FIG. 7 illustrate a block diagram of a system for determining the capabilities of devices in the system and updating transmission formats based upon new capabilities in accordance with at least one aspect of the present invention. As new capabilities are developed and/or implemented, server 110 is updated with the available capability 210. The available capabilities may be received from a database. The database may be internal to or external from the server 110. In accordance with at least one aspect of the present invention, server 110 requests a determination of terminal capabilities at a terminal 180 in order to allow for transmission of a new service to the terminal 180 in a particular desired manner.

In accordance with another embodiment of the present invention, server 110 also may transmit a request and the list of capabilities in the server and not in a network node to one or more network node(s) 150 between the server 110 and the terminal 180 in a similar manner as described with reference to FIG. 3. It may be necessary to transmit the request and the list of capabilities to the network node (s) 150 in order to ensure that all components/devices in the transmission path between the server 110 and the terminal 180 are capable of transmitting data/content associated with the new capabilities.

In accordance with still another embodiment of the present invention, server 110 may transmit a request and the list of capabilities in the server and not in a mobile terminal to the network node only, without transmitting a similar request and the list of capabilities to the terminal device. In response, the network node transmits the request and the list of capabilities to the user terminal when the terminal comes into connection with the network node. Alternatively, the network node may transmit the request according to some schedule. Further, the network node transmits the received and updated list of capabilities to the server.

In another embodiment of the present invention, the updated list of capabilities is transmitted back to the server 110 by terminal 180 or network node 150 with additional information of where the updated feature/application/devices are available for usage, e.g., location information of the feature/application/devices, is included in the subscriber information database 112. For example, different devices and/or capabilities may be used in a car, at an office, and at home. The user terminal 180 may update its location to the server 110 whenever its location has changed, and the server 110 may use this location information to select the device/application/ technology/feature for the receiving service. Additionally, the updated list of capabilities is transmitted back to the server 110 by terminal 180 or network node 150 with additional information of context in which the updated feature/application/devices are available for usage, e.g., presence or availability information of the feature/application/devices, is included in the subscriber information database 112.

In another embodiment of the present invention, when server 110 has an updated list of capabilities of the terminal 180, server 110 may determine new services that the terminal is capable to receive and use and those capabilities that the user of the terminal does not currently have a subscription to utilize. In response, server 110 may suggest to the user new services that the user may reject or accept. These new services may be such as a DVB-H mobile TV service, media download from a data carousel, or any other service. In another embodiment of the present invention, if a user has several devices in use and registered in the subscriber information database 122, server 110 may select one of the user devices that best match with the capabilities of the server 110 and/or a network node and may suggest to the user to use that best matched device for using a service.

In still another embodiment of the present invention, the updated list of capabilities may be transmitted back to the server 110 by terminal 180 or network node 150 with additional information on which one of the user devices is in use. For example, different devices and/or capabilities may be used in a car, at an office, and at home. User terminal 180 may update its presence information to server 110 whenever its presence information has changed, and server 110 may use this information to select the device/application/technology/feature for the receiving service. In another embodiment of the present invention, server 110 may transmit a whole listing of capabilities of the server 110 to the terminal 180 for comparison. Alternatively, server 110 may request the terminal 180 to transmit a whole listing of capabilities of the terminal 180 to server 110 for storing in the subscriber information database 112 and for comparison of the capabilities in server 110.

In yet another embodiment of the present invention, if a user terminal 180 has a mobile TV receiver, such as DVB-H and/or digital multimedia broadcasting (DMB), and wireless telecommunication access means, and if these capabilities are updated to server 110, one or more parts of content may be transmitted via mobile TV broadcasting, e.g., by streaming, and one or more parts of content may be transmitted via the wireless telecommunication access, e.g. by night time. When the content is consumed, these parts may be combined and presented to the user according to instructions in the parts of content. In another embodiment of the present invention, the terminals, nodes or other servers may be categorized/grouped based upon the capability information. Based upon this categorization, server 110 may manage the capabilities, e.g., update them and use them.

Figure 8:
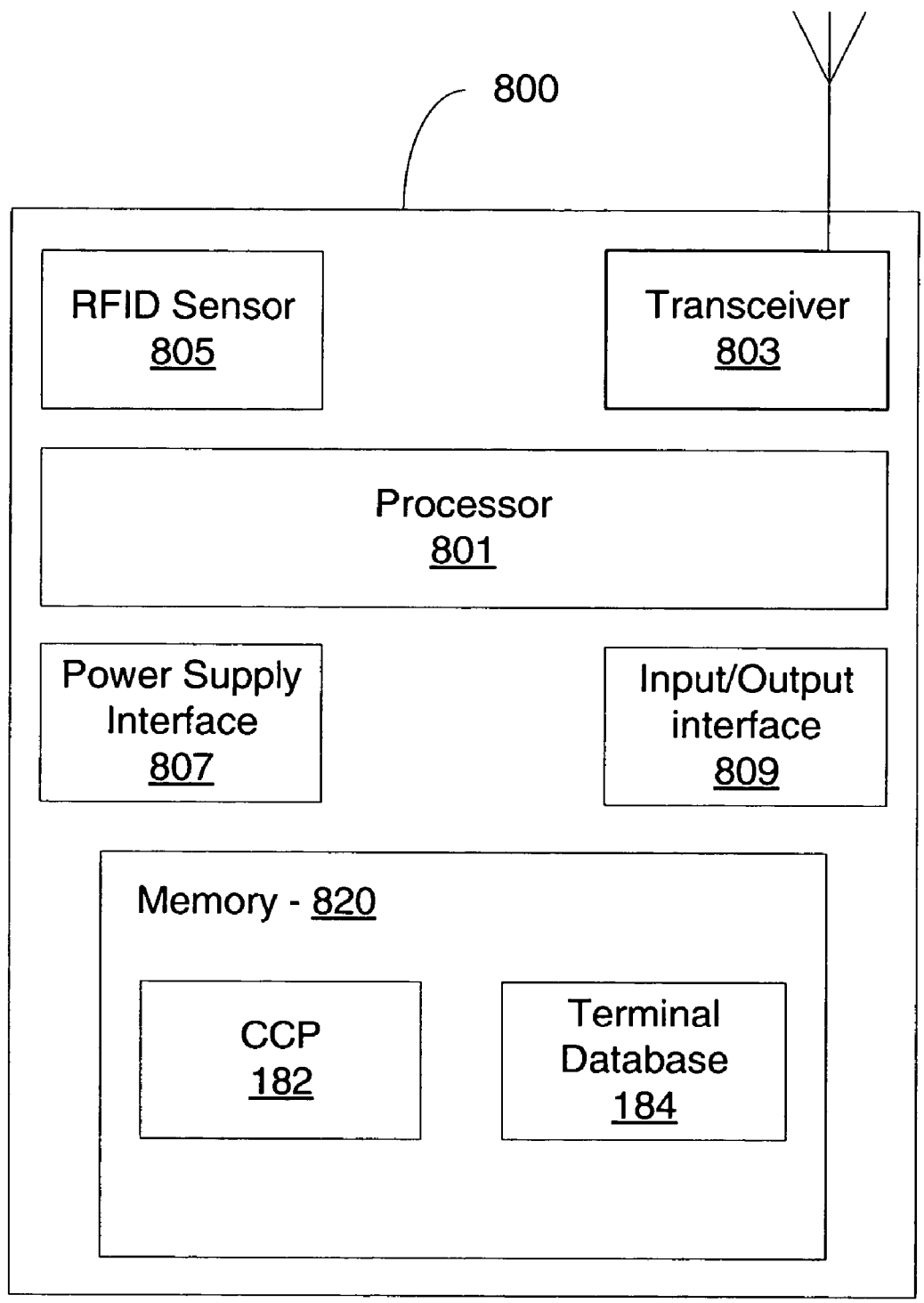
FIG. 8 illustrates a block diagram of a mobile terminal in accordance with at least one aspect of the present invention.

FIG. 8 illustrates a block diagram of a mobile terminal adapted to perform as described above, e.g., as the terminal 180. Mobile terminal 800 may be a mobile telephone, personal digital assistant (PDA), personal communication device, wireless communication device, personal wireless server, wireless HD device, digital camera, digital camcorder, digital audio and/or video device, portable PC, mobile TV, GPS device, personal video recorder (PVR), digital video recorder (DVR), set-top box (STB), game device, or any combination or other mobile device with integrated wireless telecommunications capabilities. Alternatively, all the above mentioned devices may be connected by wireline connection, such as a USB connection or any other device. Mobile terminal 800 may include a processor 801, transceiver 803, Input/ Output interface 809, power supply interface 807, radio frequency identification (RFID) reader or sensor 805, and memory 820. Input/Output interface 809 may include one or more input and/or output devices such as input buttons, microphone, digital camera, speaker, display screen, one or more sensors, and the like. Input/Output interface 809 may be a connection for allowing an external device with a different capability, such as an external display device that permits HD reception, external audio device, external TV, game console, to be connected to the mobile terminal 800 and to increase its capabilities. The Input/Output interface 809 may allow wireless or wireline connections. Transceiver 803 is used to communicate with one or more wireless networks (e.g., network node 150), and may include multiple communication mode capabilities, e.g., analog, digital (GSM, CDMA, WLAN, Bluetooth, WiFi, etc.). RFID reader or sensor 805 allows for the receipt of RF technology data by the mobile terminal 800. RFID sensor 805 may be configured to launch an application and/or event upon receipt of an RFID signal. Alternatively, one or more components of the mobile terminal 800 may be configured to operate differently upon receipt of an RFID signal. Power supply interface 807 may be configured to allow for connection of a power supply with an added capability, such as GPS. The RFID reader or sensor 805 may implemented by changing special device covers or a battery back having an RFID reader. A GPS device may be implemented similarly.

Memory 820 may store operating system software, data connection software, data services software, multimedia software, and other software, and downloaded media content. Memory 820 also may include a client component proxy 182 and a terminal database 184 as described above. One or more aspects of the present invention as described above may be performed with mobile terminal 800. It should be understood by those skilled in the art that the present invention is not so limited and that this is merely an illustrative example.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the spirit and scope of the present invention. The description is thus to be regarded as illustrative instead of restrictive of the present invention.

We claim:

1. A method, comprising:
   receiving from a server a request to confirm a set of capabilities of a mobile terminal, said request comprising a list of capabilities, wherein said list of capabilities does not include a first capability;
   comparing at the mobile terminal the list of capabilities received from the server to a current set of capabilities of the mobile terminal;
   determining that the first capability is not in the received list of capabilities;
   identifying to the server the first capability of the mobile terminal;
   receiving a second request to confirm a second capability of a second mobile terminal, said second request including the list of capabilities;
   comparing the list of capabilities to current capabilities of the second mobile terminal;
   updating the list of capabilities to include whether the second capability of the second mobile terminal matches any capability listed in the list of capabilities; and
   transmitting to the server the updated list of capabilities, including whether the second capability of the second mobile terminal matches any capability in the list of capabilities.

2. The method of claim 1, wherein the identifying includes:
   updating the received list of capabilities to include the first capability; and
   transmitting the updated list of capabilities to the server.

3. The method of claim 1, wherein the first capability includes at least one of: a new application, a new driver, and a new feature.

4. The method of claim 1, further comprising updating a second list of capabilities of the mobile terminal to include the first capability.

5. The method of claim 1, further comprising receiving at the mobile terminal a service configured to utilize the first capability.

6. The method of claim 1, further comprising receiving a service based upon information provided in the updated list of capabilities, including whether the second capability of the second mobile terminal matches any capability in the list of capabilities.

7. The method of claim 6, further comprising determining whether a threshold number of devices includes the capability.

8. The method of claim 1, further comprising transmitting location information, the location information identifying where the first capability is available for usage.

9. The method of claim 8, further comprising receiving a service based upon information provided in the updated list of capabilities and a location of the mobile terminal.

10. A computer-readable medium comprising computer-executable instructions, which when executed on a computing device, perform the method of claim 1.

11. A method comprising:
    maintaining a first list of capabilities for each of a plurality of network nodes, and a second list of capabilities for each of a plurality of terminals;
    determining whether a network node of the plurality of network nodes is capable of delivering a service to a terminal of the plurality of terminals in accordance with a specified format;
    upon determining that the network node is not capable of delivering the service to the terminal in accordance with the specified format, updating the network node to be able to deliver the service;
    selecting the network node for transmission of the service to the terminal; and
    delivering the service to the terminal via the network node.

12. The method of claim 11, further comprising determining a number of terminals configured to receive the service in accordance with the specified format.

13. The method of claim 12, wherein updating the network node occurs when the number of terminals is greater than a specified threshold value.

14. A computer-readable medium comprising computer-executable instructions, which when executed on a computing device, perform the method of claim 11.

15. A method comprising:
    maintaining a first list of capabilities of a plurality of network nodes, and a second list of capabilities of a plurality of terminals;
    determining whether a first network node of the plurality of network nodes is capable of delivering a service to a terminal of the plurality of terminals in accordance with a specified format;
    upon determining that the network node is not capable of delivering the service to the terminal in accordance with the specified format, identifying a second network node of the plurality of network nodes configured to deliver the service;
    selecting the second network node for transmission of the service to the terminal; and
    delivering the service to the terminal through the second network node.

16. A computer-readable medium comprising computer-executable instructions, which when executed on a computing device, perform the method of claim 15.

17. A method comprising:
    comparing a first list of capabilities of a server against a second list of capabilities of a device;
    creating a third list of capabilities in the server but not in the device;
    transmitting data to the device, said data comprising a request to confirm the capabilities of the device, said request including the third list;
    receiving data identifying a current capability of the device on the third list; and
    updating, at the server, the second list of capabilities based on the identified current capability.

18. The method of claim 17, wherein receiving data identifying a current capability includes receiving an updated list of capabilities, the updated list including information of current capabilities of the device.

19. The method of claim 18, wherein updating, at the server, the second list, includes updating the second list based on the updated list of capabilities.

20. The method of claim 17, further comprising:
    reviewing the updated second list; and
    transmitting a service to the device based upon the updated second list.

21. A computer-readable medium comprising computer-executable instructions, which when executed on a computing device, perform the method of claim 17.

22. The method of claim 17, further comprising:
wirelessly transmitting data to update a particular capability of the device; and
receiving confirmation of the update of the particular capability.

23. The method of claim 22, further comprising wirelessly transmitting a service to the device based upon the confirmation of the update of the particular capability.

24. The method of claim 23, wherein the service is wirelessly transmitted in accordance with the particular capability.

25. An apparatus comprising:
a processor controlling at least some operations of the apparatus;
a memory comprising:
a subscriber information database, the subscriber information database comprising a first listing of capabilities of a device associated with the apparatus;
a server information database, the server information database comprising a second listing of the capabilities of the apparatus;
a first application configured to update the subscriber information database;
a second application configured to update the server information database; and
a third application configured to compare information between the subscriber information database and the server information database,
said memory storing computer executable instructions that, when executed by the processor, cause the apparatus to perform a method comprising:
creating a list of capabilities in the apparatus and not in the device,
transmitting to the device a request to confirm a capability of the device, the request including the list of capabilities,
receiving data identifying a current capability of the device from the list of capabilities, and
transmitting a service to the device based upon the identified current capability.

26. The apparatus of claim 25, wherein the memory further includes:
a network node information database, the network node information database comprising a third listing of capabilities of network nodes associated with the apparatus; and
a fourth application configured to update the network node information database,
wherein the third application configured to compare information between the subscriber information database and the server information database further is configured to compare information between the network node information database and the server information database.

27. The apparatus of claim 26, wherein the apparatus is configured to select a network node from the network node information database.

28. The apparatus of claim 27, wherein the apparatus is configured to determine whether the selected network node is configured to transmit the service to the device.

29. The apparatus of claim 28, wherein the apparatus is configured to select a second network node from the network node information database when the selected network node is unable to transmit the service to the device.

30. The apparatus of claim 25, wherein the device is a wireless mobile terminal.

31. A method comprising:
comparing, in a server, a first list of capabilities of the server against a second list of capabilities of a mobile terminal;
creating a third list of capabilities in the server and not in the mobile terminal;
wirelessly transmitting data to the mobile terminal, said data comprising a request to confirm the capabilities of the mobile terminal, said request including the third list;
receiving the request at the mobile terminal and comparing the third list to current capabilities of the mobile terminal;
identifying, to the server, a current capability of the mobile terminal on said third list; and
updating, at the server, the second list of capabilities based on the identified current capability.

32. The method of claim 31, wherein the identifying includes transmitting an updated list of capabilities to the server, the updated list including information of current capabilities of the mobile terminal.

33. The method of claim 32, wherein updating, at the server, the second list includes updating, at the server, the second list of capabilities based on the updated list of capabilities.

34. The method according to claim 31, further comprising:
reviewing the updated second list of capabilities; and
transmitting a service to the mobile terminal based upon the updated second list.

35. A mobile device comprising
a processor controlling at least some operations of the mobile device;
a memory storing computer executable instructions that, when executed by the processor, cause the mobile device to perform a method comprising steps of:
receiving a first capability at the mobile device;
receiving from a server a request to confirm a set of capabilities of the mobile device, said request comprising a list of capabilities, wherein said list of capabilities does not include the first capability;
comparing at the mobile device the list of capabilities received from the server to a current set of capabilities of the mobile device;
determining that the first capability is not in the received list of capabilities;
identifying to the server the first capability of the mobile device;
transmitting location information, the location information identifying where the first capability is available for usage.

36. The mobile device of claim 35, wherein the first capability includes at least one of: a new application, a new driver, and a new feature.

37. The mobile device of claim 35, the method further comprising: updating the received list of capabilities to include the first capability; and
transmitting the updated list of capabilities to the server.

38. The mobile device of claim 37, the method further comprising receiving a service configured to utilize the first capability based upon information transmitted in the updated list of capabilities and a location of the mobile device.

* * * * *